June 7, 1927.

J. KIEWICZ

TOOL FOR INSERTING OR REMOVING SCREWS

Filed Nov. 18, 1924

1,631,489

Inventor.
John Kiewicz
by Heard Smith & Tennant.
Attys.

Patented June 7, 1927.

1,631,489

UNITED STATES PATENT OFFICE.

JOHN KIEWICZ, OF BOSTON, MASSACHUSETTS, ASSIGNOR TO THE REECE BUTTON HOLE MACHINE COMPANY, OF BOSTON, MASSACHUSETTS, A CORPORATION OF MAINE.

TOOL FOR INSERTING OR REMOVING SCREWS.

Application filed November 18, 1924. Serial No. 750,526.

This invention relates to a tool for manipulating a screw having a head provided with two portions of different diameters, both of which are externally screw threaded. This form of screw is useful for a great variety of purposes wherever it is desired to connect two articles or parts of articles together in such a way as to prevent unauthorized persons from removing the screw.

Merely to illustrate one possible use for the invention I would refer to its use in connection with the attachment of a counter or indicator to some machine. It is a common practice in some industries for the manufacturer to rent some of the machines which he is using and to pay for the use of the machine a sum dependent upon the amount of work performed by the machine. For instance, in the case of a clothing manufacturer it is more or less common for such a person to rent or lease buttonhole sewing machines for use in his business and to pay a royalty or license fee which is determined by the number of buttonholes made.

In such case it is customary to attach a counter to the buttonhole sewing machine which will count either the buttonholes or stitches as they are made, these counters usually being attached to the machines by means of screws.

One use to which the screw thread illustrated is specially adapted is that of securing such counters or indicators to the machine so as to make it impossible for any unauthorized person to remove the counter for the purpose of re-adjusting it or for any other purpose. The above reference to the use of the screw in attaching an indicator to buttonhole sewing machines is, however, simply for the purpose of illustrating one possible use thereof.

The screw above referred to is herein shown as having its head enclosed within a protected shell so as to make it impossible for an unauthorized person to grip the head and turn the screw by a pair of pliers or similar instruments.

The tool embodying my present invention is specially designed to provide a gripping engagement with the screw head while the latter is situated within the protecting sleeve.

In order to give an understanding of the invention I have illustrated in the drawings a selected embodiment thereof which will now be described after which the novel features will be pointed out in the appended claims.

Figure 1:
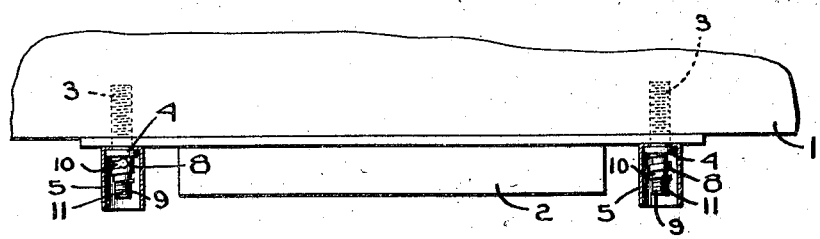
Fig. 1 is a fragmentary view showing the way in which the screw may be used.
Figure 2:
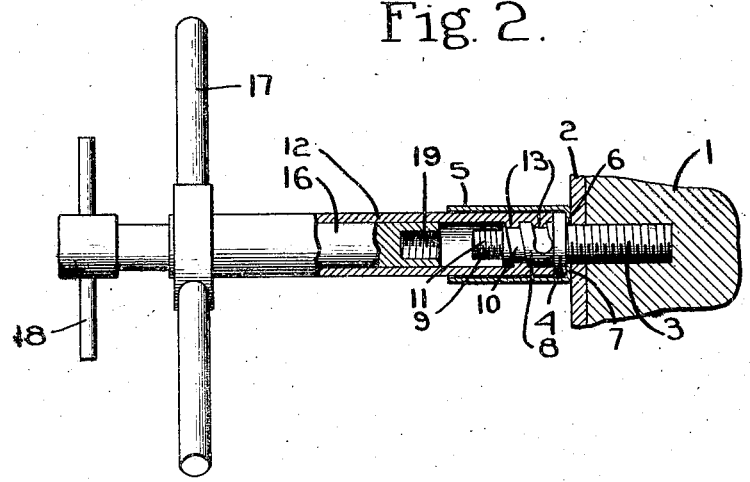
Fig. 2 is a sectional view illustrating the manner of inserting the screw.

In Fig. 1, 1 and 2 indicate two parts that are to be secured together by means of my improved screw. The part 1 may be a machine of some type and the part 2 may be a counter or indicator to be attached to the part 1, or these parts 1 and 2 may be any two parts which are to be secured together.

The screw for connecting the parts 1 and 2 is formed with a screw-threaded shank 3 which is adapted to screw into the part 1 and with a head which includes a flange or collar 4 that is adapted to engage the part 2. For protecting the screw against manipulation by an unauthorized person, I propose to employ a shield 5 which is in the nature of a cylindrical shell that encloses the head of the screw. This shield is a cup-shaped member and has a hole 6 in its end 7 through which the shank 3 of the screw extends, said head 7 being confined between the collar 4 and the part 2. When the shield is in place it protects the head of the screw from improper manipulation.

In order to provide for inserting the screw or removing it I propose to make the head of special construction and to employ a special tool for manipulating the screw. In the construction herein shown the head of the screw comprises the two parts 8 and 9 of different diameter. The part 8 of larger diameter has formed thereon a coarse screw thread 10 which is in the same direction as the screw threads on the shank 3. The portion 9 of smaller diameter is provided with relatively fine screw threads 11 also extending in the same direction.

The special tool which I use for removing the screw comprises a tubular member 12 of a size to enter the open end of the protecting sleeve 5 and having at its inner end an internal screw thread 13 which fits the coarse screw thread 10. The tool also includes a locking member 16 which extends axially of the tubular member 12 and has at its inner end a screw-threaded socket 19 having relatively fine screw threads adapted to fit the screw-threaded portion 11. The diameter of the locking member 16 and the diameter of the bore of the member 12 is somewhat greater than the diameter of the screw-threaded portion 13 so that when the locking member 16 is screwed onto the portion 9 it will lock the member 12 from being unscrewed from the portion 8.

The member 12 may conveniently have handles 17 by which it may be turned and the locking member 16 which extends beyond the member 12 may also conveniently have handles 18 by which it may be turned.

The locking member 16 is free to be moved longitudinally of the member 12 and also is free to turn in the member 12.

In using the device for inserting the screw the member 12 will be screw threaded onto the portion 8 of the head until the end of the member 12 engages the collar 4. This engagement will prevent further turning movement of the member 12 relative to the screw so that if the member 12 is turned by the handles in the proper direction the screw-threaded shank 3 of the screw will be screwed into the member 1.

In placing the screw in position it will be understood that the protecting shield 5 will first be slipped over the head of the screw as shown in the drawings so that when the screw is tightened the shield 5 will enclose the head. After the screw has been set up tight then the tool 12 may be removed from the head of the screw thus leaving the screw in its protected condition shown in Fig. 1.

Figure 3:
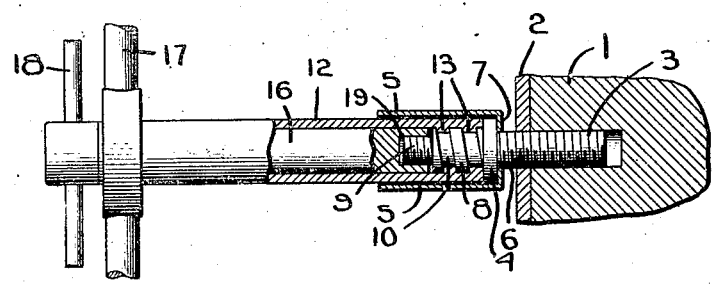
Fig. 3 is a similar view showing the manner in which the screw is removed.

For removing the screw the member 12 is first screwed onto the portion 8 of the head until said member engages the collar 4 and then the locking member 16 is inserted and screwed onto the portion 11 of smaller diameter and having the finer screw threads as shown in Fig. 3. When the locking member 16 is screwed up tight it acts to lock the member 12 to the screw head so as to prevent it from screwing off from the screw head as it is turned backwardly.

This locking action results from the fact that the screw threads 10 are coarser than the screw threads 11 and because of this fact when the tool is turned backwardly the tubular part 12 will tend to unscrew from the head of the screw faster than the locking member 16 and by reason of this fact it will bind against the end of the member 16 since said end is larger than the screw-threaded portion of the bore of the tubular member 12. The tool is thus locked to the screw and cannot be removed therefrom until the locking member has been unscrewed from the portion 9. So long as the parts are in the relative position shown in Fig. 3, therefore, the tool may be used for unscrewing the shank 3 of the screw from the part 1.

In inserting the screw it is only necessary to use the tubular member 12 as the latter will become locked to the screw as soon as it is screwed down against the flange 4. In removing or backing off the screw, however, it is necessary to use the locking member 16 to lock the member 12 to the screw head as shown in Fig. 3.

While I have illustrated one embodiment of the invention I do not wish to be limited to the constructional features shown.

I claim:

1. A tool for removing or inserting a screw having a screw-threaded shank and a head, said head having thereon a coarse and a fine screw thread, the coarse screw thread being on a portion of larger diameter than the fine screw thread, said tool comprising a tubular member having on one end interior screw threads to engage the coarse screw threads of the screw head and provided at the other end with a handle, and a locking member telescoping within the tubular member and provided at one end with interior screw threads adapted to engage the finer screw threads of the screw head, said end of the locking member being larger than the screw-threaded portion of the bore of the tubular member, whereby when both the tubular member and the locking member have been screwed tightly to the head the tubular member is locked to the head and the screw can be manipulated by manipulating the tubular member.

2. A tool for inserting or removing a screw provided with a head having two portions of different diameters, both of which are externally screw threaded with the screw threads on the larger portion coarser than those on the smaller portion, said tool comprising a tubular member having at one end screw threads to engage the coarse screw threads of the screw head and provided at the other end with a handle, and a locking member telescoping within the tubular member and provided at one end with screw threads adapted to engage the finer screw threads of the screw head, said end of the locking member being larger than the screw-threaded portion of the bore of the tubular member whereby when both the tubular member and the locking member have been screwed to the head the tubular member is locked to the head.

3. A tool for inserting or removing a screw provided with a head having two portions of different diameters, both of which are externally screw threaded with the screw threads on the larger portion coarser than those on the smaller portion, said tool comprising a tubular member having at one end screw threads to engage the coarse screw threads of the screw head and provided at the other end with a handle, and a locking member telescoping within the tubular member and provided with screw threads adapted to engage the finer screw threads of the screw head, whereby when both the tubular member and the locking member have been screwed to the head the tubular member is locked to the head.

In testimony whereof, I have signed my name to this specification.

JOHN KIEWICZ.